No. 686,015. Patented Nov. 5, 1901.
E. WHITTUM, Dec'd.
A. A. WHITTUM, Administratrix.
THREAD GUIDE AND THREAD GUIDE SUPPORT FOR SPINNING MACHINES.
(Application filed Mar. 10, 1900.)
(No Model.) 2 Sheets—Sheet 1.
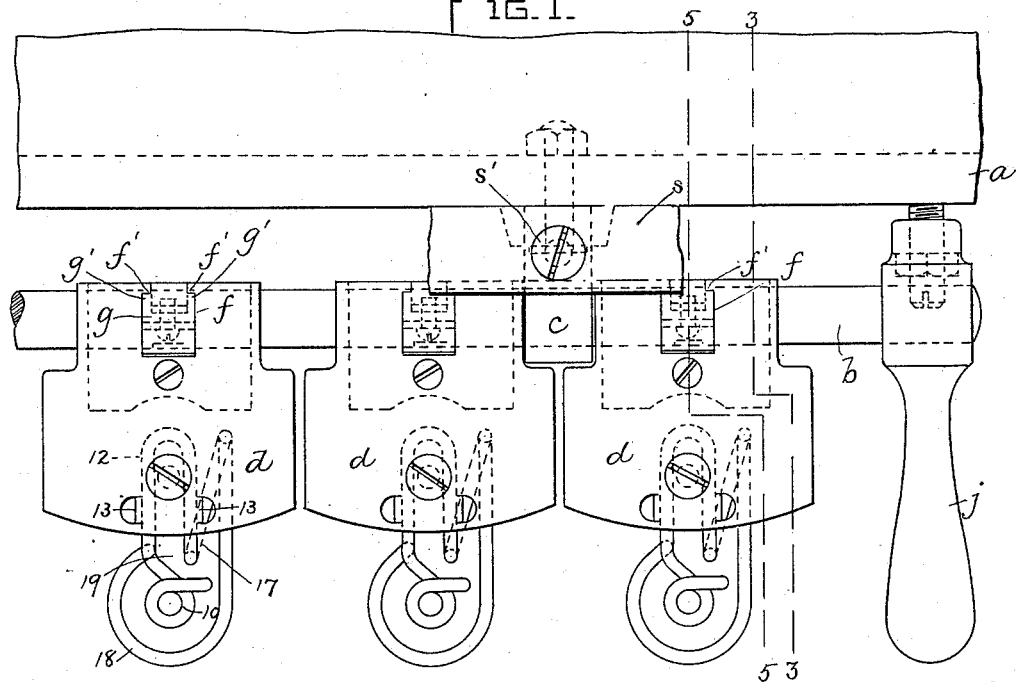
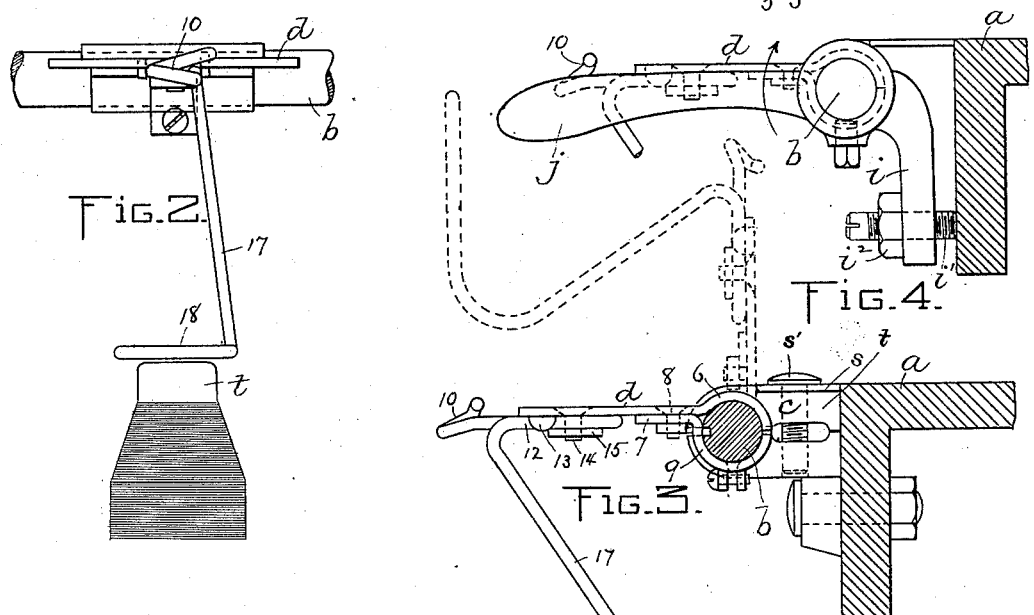
WITNESSES:
A. D. Harrison
P. W. Pezzetti
INVENTOR:
E. Whittum
by Hugh R. Brown Quimby
Attys.

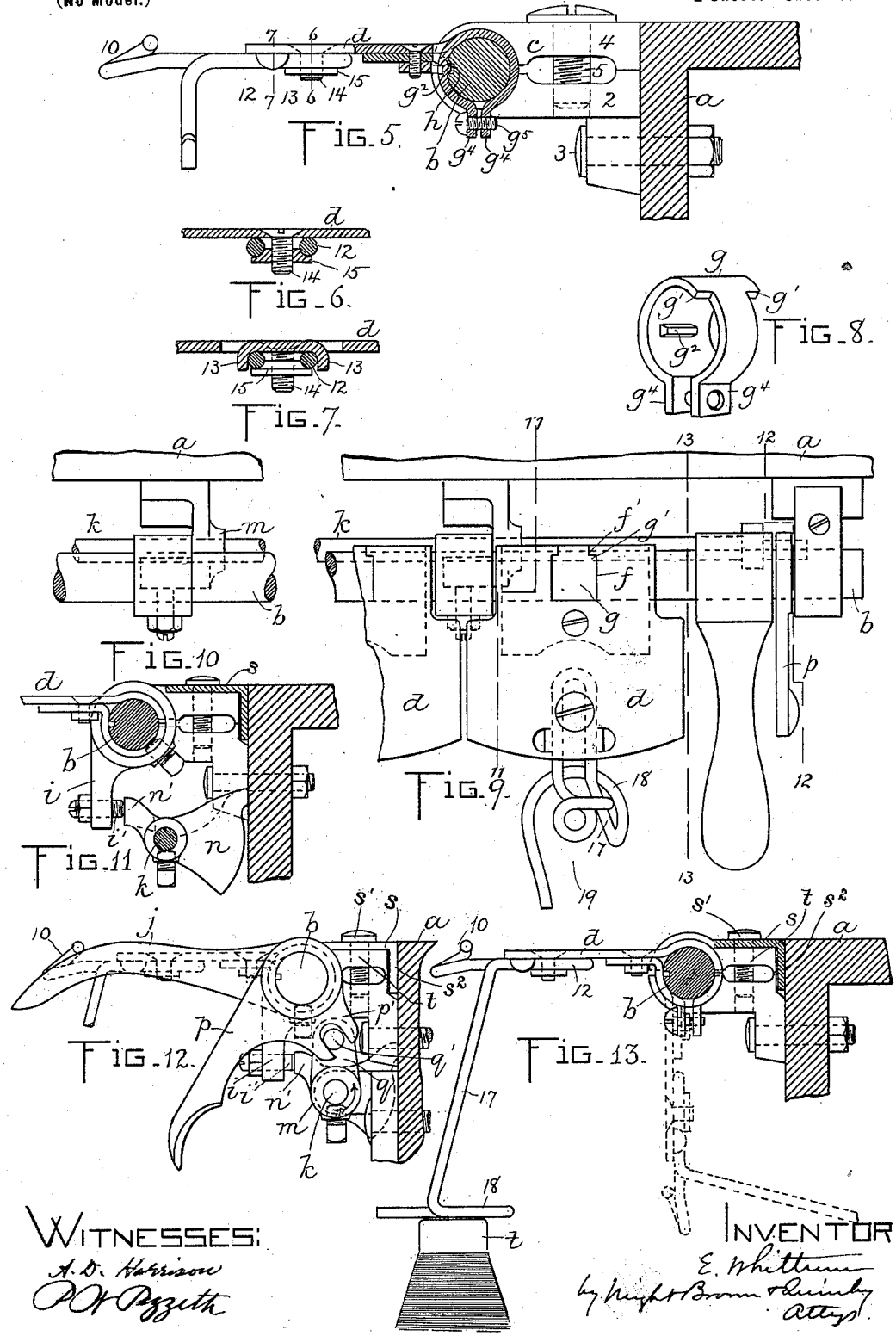

UNITED STATES PATENT OFFICE.

EDWARD WHITTUM, OF PROVIDENCE, RHODE ISLAND; ANNIE A. WHITTUM, OF FALL RIVER, MASSACHUSETTS, ADMINISTRATRIX OF SAID EDWARD WHITTUM, DECEASED.

THREAD-GUIDE AND THREAD-GUIDE SUPPORT FOR SPINNING-MACHINES.

SPECIFICATION forming part of Letters Patent No. 686,015, dated November 5, 1901.

Application filed March 10, 1900. Serial No. 8,133. (No model.)

*To all whom it may concern:*

Be it known that I, EDWARD WHITTUM, of Providence, in the county of Providence and State of Rhode Island, have invented certain new and useful Improvements in Thread-Guides and Thread-Guide Supports for Spinning-Machines, of which the following is a specification.

This invention has for its object to provide certain improvements in thread-guides for spinning-machines and their supports and to substitute for the ordinary wooden thread-board, which is liable to warp and is relatively expensive, a metal thread-board, which is free from the said objections and is more durable.

The invention consists in the improvements which I will now proceed to describe and claim.

Of the accompanying drawings, forming a part of this specification, Figure 1 represents a top plan view of a portion of the roller-beam of a spinning-machine and a series of thread-guides and their supports embodying my invention. Fig. 2 represents a front view showing one of the thread-guides and its support. Fig. 3 represents a section on the line 3 3 of Fig. 1. Fig. 4 represents an end view of the construction shown in Fig. 1. Fig. 5 represents a section on line 5 5 of Fig. 1. Fig. 6 represents a section on line 6 6 of Fig. 5. Fig. 7 represents a section on line 7 7 of Fig. 5. Fig. 8 represents a perspective view of one of the stop-sleeves. Fig. 9 represents a top plan view showing an embodiment of my invention differing in certain respects hereinafter specified from that shown in Figs. 1 to 5, inclusive. Fig. 10 represents a top plan view of a portion of the mechanism shown in Fig. 9. Fig. 11 represents a section on line 11 11 of Fig. 9. Fig. 12 represents a section on line 12 12 of Fig. 9. Fig. 13 represents a section on line 13 13 of Fig. 9.

In the drawings, $a$ represents the roller-beam of a spinning-machine. $b$ represents a rod or shaft which is journaled in bearings $c$, affixed to the beam, each bearing being shown as composed of a bracket-shaped lower member 2, Fig. 5, attached by a bolt 3 to the beam $a$, and an upper member 4, attached by a screw 5 to the member 2. The shaft $b$ may be of any desired length and supports a series of the thread-guide holders hereinafter described, a suitable number of the bearings $c$ being provided to properly support the shaft and its attachments and permit it to be partially rotated to swing the thread-guides to and from their operative position.

$d\ d$ represent the thread-guide holders, each of which comprises a flat metal plate or body having at its rear end a socket formed to embrace the shaft $b$, said socket comprising the curved rear portion 6, Fig. 3, of the holder $d$ and a bottom plate 7, attached by a screw 8 to the holder $d$ and having a curved portion 9, which fits the under portion of the shaft, the two curved portions 6 and 9 forming a substantially tubular socket which closely fits the shaft and is adapted to turn thereon to a limited extent, as presently described, to permit either holder and its thread-guide to be displaced from its operative position without displacing the others.

The support $d$ is provided with suitable means for engaging and holding the thread-guide, which is a wire arm bent to form the usual open eye or pigtail 10 and a loop 12, having parallel sides. The loop bears against the under side of the support $d$, which has two downwardly-projecting ears 13 13 bearing against the sides of the loop. A screw 14 is inserted in a hole formed for its reception in the support $d$ and passes through the loop. A nut 15 is engaged with the screw and has its upper side formed to fit the sides of the loop 12, as shown in Fig. 6. The ears 13, screw 14, and nut 15 coöperate in firmly securing the thread-guide 10 to the support $d$.

Each support $d$ is connected with the shaft $b$ in such manner that it is capable of independently swinging to a limited extent on the shaft, so that any support, with its thread-guide, may be raised independently of the others. To this end the socket of each support is formed with a slot $f$, the edges of which are offset to form the shoulders $f'\ f'$, and the shaft $b$ is provided with a series of collars $g$, one for each slot, each collar having shoulders $g'\ g'$, formed to abut against the shoulders $f'$ $f'$ and limit the independent swinging movement of the support $d$, with which it is engaged. Each collar $g$ is engaged with the shaft by means of a tongue or projection $g^2$, Figs. 5 and 8, entering a longitudinal slot $h$ in the shaft, the said tongue being preferably integral with the sleeve and formed by pressing inwardly a portion of the metal of the sleeve by means of suitable dies. The shoulders $f'$ $f'$ and $g'$ $g'$ are so arranged that they abut against each other when the support $d$ is in its operative position, the shoulders preventing the support from swinging independently downward from said position, but permitting it to swing upwardly therefrom, the upward swinging of the support $d$ separating the shoulders $f'$ thereon from the shoulders $g'$ on the corresponding sleeve. The collar $g$ is provided with eyes $g^4$ $g^4$, which receive a clamping-screw $g^5$.

As above stated, the shaft $b$ is adapted to be turned in its bearings to simultaneously displace all the supports $d$ and their thread-guides. This movement of the shaft may be in the direction required to raise the supports $d$, as shown by dotted lines in Fig. 3, or it may be in the direction required to depress the said supports, as shown by dotted lines in Fig. 13. When the shaft is arranged to swing the supports upwardly, it is held in its normal position by the bearing of a stop-arm $i$ against the roller-beam $a$, as shown in Figs. 1 and 4, said arm having an adjustable end consisting of a screw $i'$, confined by a nut $i^2$, the screw abutting against the roller-beam and being adjusted to hold the shaft $b$ with the supports $d$ projecting horizontally. The shaft has a handle $j$, by which it may be turned in the direction indicated by the arrow, Fig. 4, to raise the thread-guides and their supports, this motion causing the shoulders $g'$ to act on the shoulders $f'$ in such manner as to raise the supports $d$, the arm $i$ leaving the beam $a$. When the shaft is turned in the opposite direction, the supports $d'$ are swung downwardly until the screw $i'$ on the arm $i$ strikes the roller-beam.

When the supports and thread-guides are to be displaced by a downward swinging movement, I employ a movable abutment for the stop-arm on the shaft instead of using the fixed roller-beam for said abutment, the said movable abutment being displaced when it is desired to displace the thread-guides. In Figs. 9, 10, 11, and 12 I show an arrangement for the downward displacement of the thread-guides, in which $k$ is a rod or shaft journaled in suitable bearings $m$, affixed to the roller-beam, said rod being located between the roller-beam and the stop-arms $i$ on the shaft $b$. To the shaft $k$ are affixed weighted arms $n$, which normally gravitate toward and abut against the roller-beam and have stop projections or abutments $n'$, which stand in position to arrest the screws $i'$ on the stop-arms $i$ of the shaft $b$ when the weighted arms $n$ are in their normal position, said abutments preventing the shaft $b$ from turning in the direction required to swing the thread-guides downwardly. When it is desired to displace the thread-guides, the shaft $b$ is first turned slightly to separate its arms $i$ from the abutments $n'$, and then the shaft $k$ is turned in the direction indicated by the arrow in Fig. 12, thus depressing the abutments $n'$ below the stop-arms $i$ and permitting the thread-guides and their holders to swing downwardly to the position shown by dotted lines in Fig. 13. The described movement of the shaft $k$ is caused by a handle $p$, mounted to swing independently on the shaft $b$, and having a slotted projection $p'$, the slot of which receives a stud $q'$ on an arm $q$, affixed to the shaft $k$. When the handle $p$ is swung upwardly, the arm $q$ is swung outwardly from the roller-beam and the abutments $n'$ are swung downwardly. The thread-guides and their supports may be again made operative by swinging them upwardly far enough to permit the abutments $n'$ to be restored to their operative position and then allowing the stop-arms $i'$ to swing down to the said abutments.

The supports $d$ are relatively wide flat plates of sheet or plate metal of such thickness that the supports may be formed by dies. The plates 7, forming the lower portions of the sockets that embrace the shaft $b$, are composed of the same material and may also be formed by dies. The same is true of the sleeves $g$, the described form and construction of these several parts being such that they may be made almost wholly by dies, thus reducing the cost of manufacture to the minimum. The flat form of the supports $d$ enables them to form a practically continuous shelf without wide openings between the supports, so that there is little or no liability of waste not taken up by scavenger-rolls accumulating and dropping into contact with and breaking adjacent threads.

$s$ represents a shelf or filling-piece attached to the bearing $c$ and formed to fill the space between the roller-beam $a$ and the shaft $b$, thus preventing broken threads from falling into said space. The shelf $s$ is secured by means $s'$ to the brackets $t$, in which are the bearings for the rod or shaft $b$, and is provided with a downwardly-projecting flange $s^2$, which bears on the roller-beam and stiffens the shelf, so that the shelf and flange may be made from sheet metal.

Each thread-guide may be provided with an extension comprising an arm 17, bent downwardly from one side portion of the loop 12, and a loop 18, bent from the lower portion of the arm 17 and extending in a horizontal plane when the thread-guide is in its operative position. The loop 18 is below the eye 10 and in close proximity to the upper end of the bobbin $t$ and constitutes a thread-contractor, which prevents undue ballooning of the thread. This is not new, broadly, it being shown, for example, in Letters Patent No.

238,595, where the thread-guide and the contractor are shown as made in separate parts, the contractor being formed to present an opening for the entrance of the yarn into the contractor by a lateral movement, which opening is between two parts of the contractor, one overlapping the other, so that in case the thread-guide and contractor are displaced from their operative position while the thread is in the contractor the thread remains in the contractor. I have improved the contractor by forming it so that its movement away from its operative position will cause it to leave the thread, so that the thread is not displaced by the contractor. To this end I provide the contractor with a relatively wide opening 19, which in the form shown in Fig. 1 is at the back portion of the contractor, the opening being arranged in each case so that when the contractor is swung from its operative position (the swinging movement being upward in one case and downward in the other) the opening 19 permits the contractor to pass away from the thread, which is therefore not displaced by the contractor. This is a marked advantage, because the extent of displacement of the contractor is considerably greater than that of the thread-guide, and in the old form of contractor more inconvenience results from the displacement of the thread by the contractor than by the guide.

It will be seen that the stop-collar $g$ and its tongue or projection $g^2$, adapted to be formed by dies, enables the shaft $b$ to be provided with stops (to retain the thread-guide supports in their operative positions) which are more accurate and less expensive than studs inserted in holes drilled in the shaft, the expense of drilling holes in the shaft (an operation by which it is difficult to secure accuracy and uniformity) being avoided. The cost of forming the slot $h$ in the shaft to receive the tongues $g^2$ is very slight, and there is no difficulty in securing accuracy and uniformity in the location and size of said slot.

I claim—

1. A thread-guide, a support therefor comprising a metal plate having provisions for engaging the thread-guide, and also having a two-part socket, and an operating-shaft embraced by said socket, the latter having a slot which is widened at one end to form shoulders adapted to engage a stop member on the shaft.

2. A thread-guide, and a support therefor comprising a metal plate having ears projecting downwardly from its under side to engage a loop on the thread-guide, said loop bearing on the under side of the plate, and a bolt projecting downwardly from the plate and adapted to pass through said loop, said bolt having a loop-clamping butt.

3. A thread-guide, a support therefor comprising a metal plate having provisions for engaging the thread-guide, and also having a shaft-embracing socket containing a slot which is widened at one end to form a shoulder, an operating-shaft embraced by said socket, a compressible stop-collar having a shoulder to engage the shoulder on the said socket, and means whereby the collar may be compressed and clamped upon the operating-shaft.

4. A thread-guide support having a socket, a stop-collar having a shoulder to engage a complemental shoulder on the said socket, and a tongue or projection to engage a slot in an operating-shaft.

5. A thread-guide support having a compressible socket, and a stop-collar having a shoulder to engage a complemental shoulder on the said socket, a tongue or projection to engage a slot in an operating-shaft, ears projecting from the socket, and a clamping device engaged with said ears.

6. In a spinning-machine, the combination of a rod or shaft having a longitudinal groove, a series of stop-collars embracing said shaft and having projections entering the groove, and a series of thread-guide supports having sockets which embrace and are slotted to receive the stop-collars.

7. In a spinning-machine, the combination of a rotary rod or shaft, a series of thread-guide supports mounted thereon, a stop-arm rigidly secured to the shaft and projecting downwardly therefrom, and an abutment arranged to oppose said stop-arm, said abutment being located below the shaft.

8. In a spinning-machine, the combination of a rotary rod or shaft, a series of thread-guide supports mounted thereon, a stop-arm rigidly secured to the shaft, and projecting downwardly therefrom, said arm having an adjustable terminal, and an abutment located below the shaft and arranged to oppose said terminal, the said arm and terminal permitting the simultaneous adjustment of all the thread-guides.

9. In a spinning-machine, the combination of a rotary rod or shaft, a series of thread-guide supports mounted thereon, a stop-arm rigidly secured to the shaft and projecting downwardly therefrom, and a movable abutment which normally opposes the stop-arm and is adapted to be removed from the path of the latter, said movable abutment being located below the shaft and between the arm and the roller-beam.

10. In a spinning-machine, the combination of a rotary rod or shaft, a series of thread-guide supports mounted thereon, a stop-arm rigidly secured to the shaft and projecting downwardly therefrom, a movable abutment which normally stands in the path of the stop-arm and between said arm and the roller-beam, and means for removing said abutment from the path of the arm.

11. In a spinning-machine, the combination of a rotary rod or shaft, a series of thread-guide supports thereon, a stop-arm rigidly secured to the shaft, a second rod or shaft having a weighted abutment, an operating-handle and connections between it and the abutment-carrying shaft, whereby the latter may be turned to move the abutment from its normal position.

12. In a spinning-machine, the combination of a roller-beam, a rotary rod or shaft journaled in bearings formed in brackets affixed to the roller-beam, a series of thread-guide supports and thread-guides carried by said rod, and a filling-piece or shelf interposed between the shaft and the roller-beam, and having a downwardly-projecting stiffening-flange bearing against the roller-beam, said filling-piece being secured to the said brackets.

13. An oscillatory thread-guide support and a thread-contractor thereon having an opening formed to permit the contractor to leave the thread when the support and contractor are being displaced.

14. The combination of a rod or shaft, a series of thread-guide supports thereon, and a series of thread-guides and thread-contractors on said supports, the said contractors having openings arranged to permit the contractors to leave the threads when the contractors are being displaced.

In testimony whereof I have affixed my signature in presence of two witnesses.

EDWARD WHITTUM.

Witnesses:
 C. F. BROWN,
 A. D. HARRISON.